United States Patent Office 2,749,647
Patented June 12, 1956

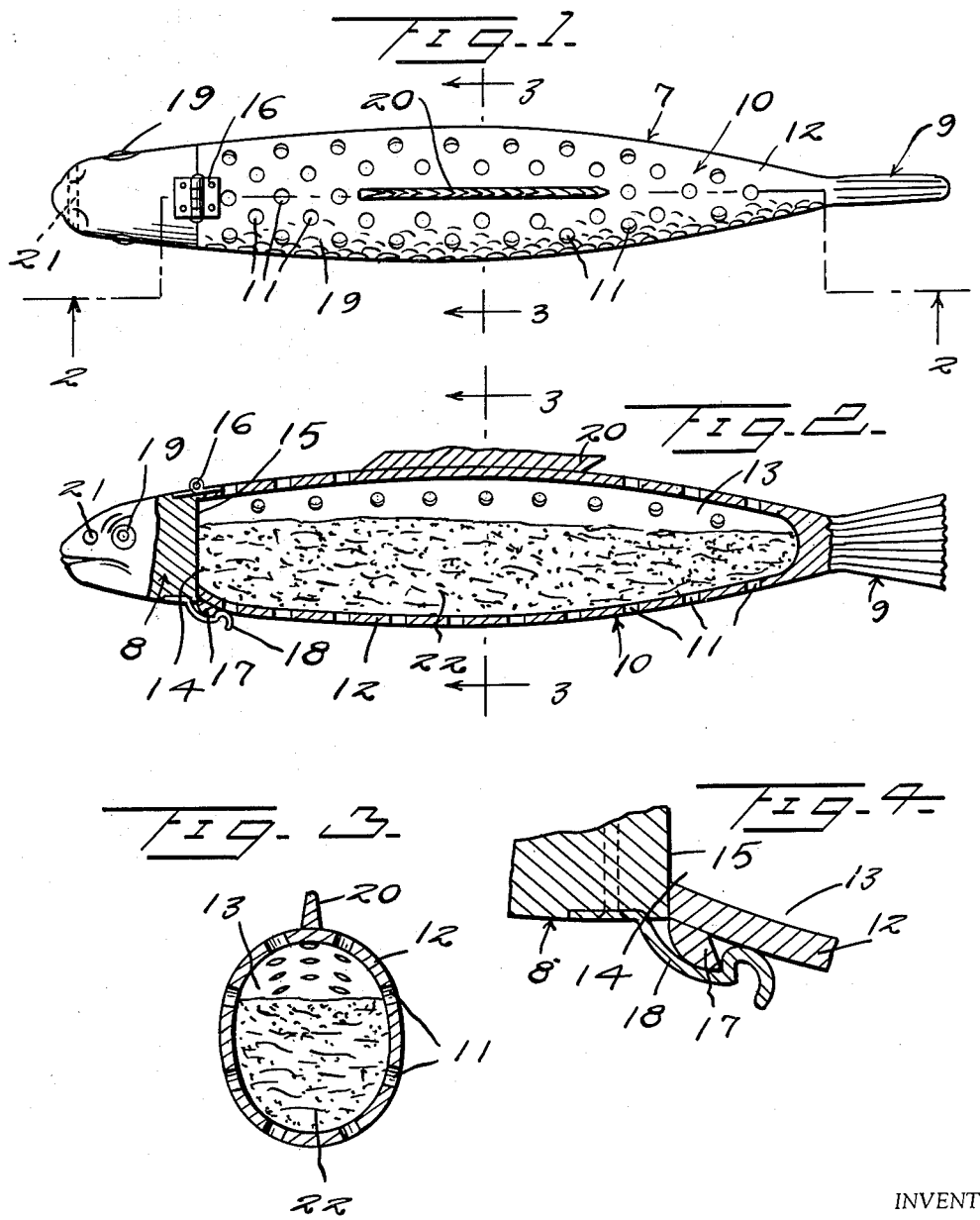

2,749,647

CHUM LURE

Richard H. Beloff, Rockport, Mass.

Application June 11, 1954, Serial No. 436,048

1 Claim. (Cl. 43—42.06)

This invention relates to a novel lure primarily adapted for use as a lobster pot bait but which may also be used for fishing.

Lobsters are not attracted by spoiled bait and for this reason it is necessary to frequently replace the bait, usually fish, by which lobster pots are baited in order to maintain bait in the lobster pots to which lobsters will be attracted. This is also necessary due to the fact that a lobster caught in a lobster pot will usually consume the entire bait contained in the pot.

Accordingly, it is a primary object of the present invention to provide a lobster pot bait or lure which is partly natural and partly artificial and wherein the natural bait is so housed within an artificial lure body that it cannot be completely consumed by a lobster caught in a lobster pot.

Another object of the invention is to provide such a lobster pot bait or lure wherein the natural bait will be discharged gradually in the form of chum for attracting lobsters to the pot even after one or more lobsters have been caught in the pot.

Still a further object of the invention is to provide such a bait or lure which will last much longer and remain effective as a lobster bait than the baits conventionally used in lobster pots.

Various other objects and advantages of the invention will hereinafter become more fully apparent from the following description of the drawing, illustrating a presently preferred embodiment thereof, and wherein:

Figure 1 is a top plan view of the lure;

Figure 2 is a longitudinal sectional view, partly in side elevation thereof, taken substantially along a plane as indicated by the line 2—2 of Figure 1;

Figure 3 is an enlarged cross sectional view of the lure, taken substantially along a plane as indicated by the lines 3—3 of Figures 1 and 2, and Figure 4 is a fragmentary enlarged detailed sectional view of a bottom portion of the lure.

Referring more specifically to the drawing, the lure body in its entirety is designated generally 7 and includes a head 8, a tail 9 and an elongated body portion 10 extending between the head 8 and tail 9 and of a length substantially greater than the length of said portions 8 and 9. The body portion 10 is hollow and has a relatively thin wall provided with a multiplicity of perforations 11 formed throughout substantially the entire length and substantially around said thin wall 12. Accordingly, the body portion 10 is provided with an elongated relatively large cavity 13 extending substantially from end-to-end of the body portion 10. The rear end of the body portion 10 merges integrally with the tail 9, which tail forms a closure for the rear end of the cavity 13. The cavity 13 is provided with an open forward end 14.

The head 8 has a substantially flat rear end 15 sized to abut against the forward end of the body wall 12 for closing the open forward end 14 of the cavity 13. Said head 8 is substantially solid. The upper part of the head 8 at its rear end is swingably connected to the upper part of the forward end of the body 10 by a hinge 16, one leaf of which is secured to the upper part of the forward end of the wall 12 and the other leaf of which is secured to the upper part of the rear end of the head 8. The lower part of the forward end of the wall 12 is provided with an externally disposed fixed detent 17 which is releasably engaged by a spring latch 18, a forward end of which is suitably anchored to the bottom part of the head 8.

The lure body 7 may be formed of any suitable material either buoyant or nonbuoyant and may be made in various sizes and shapes to simulate different species of fish and may be suitably colored and provided with suitable configurations 19 and appendages 20 on the exterior thereof. The upper part of the head 8 near the forward end or nose thereof is provided with a bore 21 extending transversely therethrough and through which a line or flexible tethering element, not shown, is adapted to extend and by means of which the lure body 7 may be tethered in a conventional lobster pot.

It will be readily apparent that the latch 18 can be disengaged from the detent 17 so that the head 8 can be swung on the hinge 16 upwardly from its position of Figure 1 relatively to the body portion 10, to an open position for exposing the open end 14 of the cavity 13. The cavity 13 is then filled or partially filled with chum 22 through said open end 14, after which the head 8 is re-latched in its closed position of Figures 1 and 2. This is accomplished before the lure body 7 is tethered in the lobster pot and may also be accomplished while the lure body is thus tethered. The chum 22 constitutes a finely divided material which is an attractive bait to lobsters and is in a finely divided form so that it will escape gradually through the perforations 11 as the water passes through said perforations out of the cavity 13 after having entered the cavity through other of the perforations. The chum 22 thus dispensed from the cavity 13 into the water adjacent the lure 7 and lobster pot, not shown, will attract lobsters to said lure and consequently into the pot. A lobster or lobsters within the pot will be prevented from consuming the chum which is within the lure body 7, by said lure body, so that the bait or lure will still function to accomplish its intended result after one or more lobsters have been caught in the pot. With conventional lobster pot bait, the bait is usually completely consumed by a lobster trapped in the pot so that the pot is no longer baited to attract other lobsters.

Any suitable chum material 22 may be used which will function as heretofore described. However, said material preferably is composed of ground lobster meat or fish mixed with oil, such as soybean or cottonseed oil, and thus produces a bait which will not readily spoil to thus retain its attractiveness to lobsters.

It will also be apparent that the lure 7 containing the chum 22 could be used as a fish lure and hooks could be readily attached to any desired part thereof.

Various other modifications and changes are contemplated and may obviously be resorted to, without departing from the spirit or scope of the invention as hereinafter defined by the appended claim.

I claim as my invention:

A chum lure for use as a lobster pot bait comprising an elongated lure body including a solid head portion, a solid tail portion shaped to simulate the tail of a fish and an elongated hollow body portion extending between the head portion and tail portion and defining a cavity having a rear end closed by the tail portion and an open forward end, said hollow body portion being provided with a plurality of perforations opening into said cavity and outwardly thereof, latch means retaining said head portion in a postition to close the open forward end of the cavity and releasable for movement of the head portion to a position for exposing said open end of the cavity, and a finely divided chum material contained within the cavity and applied thereto through the open forward end thereof, said chum material being dispensed through the perforations of the hollow body portion from said lure body for attracting lobsters to the lure by taste and smell, said head portion containing configurations simulating the eyes, nose and mouth of a natural bait fish, said body portion having an appendage simulating a fish fin, said lure body being colored to cooperate with the shape, configurations and appendage thereof to realistically simulate a natural bait fish for visually attracting lobsters and providing an enclosure by which lobsters are denied access to the chum material while contained in the cavity.

References Cited in the file of this patent

UNITED STATES PATENTS

| | | |
|---|---|---|
| 1,038,866 | Fuller | Sept. 17, 1912 |
| 1,816,725 | Freeman | July 28, 1931 |
| 1,913,362 | Catarau | June 13, 1933 |
| 2,205,472 | Fagerholm | June 25, 1940 |
| 2,302,206 | Gibson et al. | Nov. 17, 1942 |
| 2,614,358 | Adams | Oct. 21, 1952 |
| 2,639,538 | Gemmer | May 26, 1953 |
| 2,640,292 | Nadolny | June 2, 1953 |
| 2,719,382 | Schachte | Oct. 4, 1955 |